United States Patent [19]

Bougher

[11] Patent Number: 4,726,625

[45] Date of Patent: Feb. 23, 1988

[54] BELT RETRACTION CAM LOCK

[75] Inventor: Jerry D. Bougher, Lebanon, Ind.

[73] Assignee: Indiana Mills & Manufacturing, Inc., Carmel, Ind.

[21] Appl. No.: 882,414

[22] Filed: Jul. 7, 1986

[51] Int. Cl.[4] .................... A62B 35/00; B60R 21/10
[52] U.S. Cl. .................................. 297/483; 24/170; 280/808
[58] Field of Search ................. 297/483; 24/170, 191, 24/114.5; 280/801, 808

[56] References Cited

U.S. PATENT DOCUMENTS

| | | | |
|---|---|---|---|
| 3,328,856 | 7/1967 | Jonas | 24/191 |
| 3,844,001 | 10/1974 | Holmberg | 297/483 X |
| 3,852,855 | 12/1974 | Bengtsson | 24/170 |
| 3,911,535 | 10/1975 | Mauron | 24/170 |
| 4,484,766 | 11/1984 | Buchmeier | 280/808 |
| 4,549,770 | 10/1985 | Kurtti | 297/483 |

FOREIGN PATENT DOCUMENTS

| | | | |
|---|---|---|---|
| 281393 | 1/1915 | Fed. Rep. of Germany | 24/170 |
| 1025769 | 4/1953 | France | 24/170 |
| 828660 | 2/1960 | United Kingdom | 24/170 |

Primary Examiner—James T. McCall
Attorney, Agent, or Firm—Woodard, Emhardt, Naughton, Moriarty & McNett

[57] ABSTRACT

A belt retraction cam lock having belt retraction locking means disposed between a pivotal top member and a bottom member to lockingly but releasably engage the belt to counterbalance the spring biased retraction spool of an emergency locking belt retractor, and having belt unlocking means also disposed between the top and bottom members for releasing the belt from the locking engagement of the belt retraction locking means when the belt is forcibly tensioned. The belt retraction locking means includes a latitudinally disposed ridge on the base member and a first cam latitudinally disposed on and pivotal about the axis of the pivotal top member, the belt being disposed therebetween, which define a belt locking position when the top member is pivoted to align the ridge and first cam, the belt being pinchingly arrested therebetween. The unlocking means includes a second cam over which the belt is slidably passable, which cam is adjacent and parallel to the first cam but offset about the pivotal axis of the top member. The second cam is operable to provide a moment of force about the pivotal axis of the top member when the belt is forcibly tensioned within the top and bottom members, the moment of force being of sufficient magnitude to overcome the belt retraction locking means and to forcibly rotate the top member from the belt locking position to a belt unlocking position, at which position the belt is free of any influence of the belt retraction cam lock.

24 Claims, 8 Drawing Figures

BELT RETRACTION CAM LOCK

BACKGROUND OF THE INVENTION

This invention is in the field of retractors typically used with seat and shoulder belt systems.

Many patents have issued that disclose an automatic retractor device that provides a spring-biased spool for urging a webbed belt around the spool and thus into the retractor, but also providing mechanisms rendering the spring-biased spool yieldable to permit the webbed belt to be withdrawn from the retractor spool so that the opposite end of the webbed belt may be attached to a buckle or tongue. Typically, the prior art retractors are operable to permit more than the desired amount of webbed belt material to be withdrawn from the retractor spool while the operator is attaching the opposite end of the belt to a tongue or buckle. The spring-biased spool will then rewind the excess belt withdrawn back into the retractor, thereby applying a snug tension to the webbed belt.

Various mechanisms are known in the prior art for locking the spool, and thus the retractor, after snug tension around the operator has been achieved to prevent withdrawal of the webbed belt from the retractor in emergency conditions. The mechanisms found in what are known in the art as emergency locking retractors provide dual sensitive locking means. Such retractors are sensitive to (1) webbed belt acceleration, locking the spool when the webbed belt's acceleration off the spool and out of the retractor exceeds a predetermined maximum; and to (2) vehicle acceleration, locking the spool when changes in the vehicle's acceleration jar an acceleration-sensitive pendulum device within the retractor into spool-locking engagement. Such an acceleration-sensitive pendulum device for use within an emergency locking retractor is disclosed in U.S. Pat. No. 4,382,564, issued to James, and is incorporated herein by reference.

Emergency locking retractors are typically utilized in three-point seat and shoulder belt restraining systems. Referring to Prior Art FIG. 7, in a typical three point system, an emergency locking retractor 74 is permanently affixed to the vehicle, typically below shoulder level of the operator, and is oriented so the webbed belt 16 within the retractor exits the retractor vertically and upward. From the retractor 74, the webbed belt 16 is led through the first point of the three-point system, which is typically a first D-ring assembly 76 affixed to the vehicle directly above retractor 74 and above shoulder level of the operator. First D-ring assembly 76 permits the webbed belt 16 to slidably pass through the assembly and be turned downward over the shoulder and diagonally across the chest of the operator. The webbed belt 16 then is led directly to the second point of the three-point system, which is typically a second D-ring assembly 78 that is attached to a tongue 80. Tongue 80 is then insertable into a buckle 82 that is permanently affixed to the vehicle, typically below waist level of the operator. Second D-ring assembly 78 also permits the webbed belt 16 to slidably pass through the assembly and be turned across the lap of the operator whereafter the webbed belt 16 is deadened by permanent attachment to the vehicle, also at a point typically below waist level of the operator, thereby becoming the third point of the three-point system 84. When the operator inserts tongue 80 into buckle 82 the three-point seat and shoulder belt retraction system is closed and operational.

It is known to provide an emergency locking retractor in a three-point system, as described above, as an operator restraining device in moving vehicles of all types. A typical application is in the passenger automobile, both foreign and domestic. With appropriately-adjusted webbed belt accleration sensitivity and vehicle acceleration sensitivity, the operator has adequate freedom of movement even while otherwise restrained in the closed three-point system. The webbed belt can be withdrawn from the retractor at rates of acceleration less than that which would lock the retractor, and the passenger car being fairly smooth riding, changes in vehicle acceleration in normal operation would not be expected to jostle the acceleration-sensitive pendulum device within the retractor into spool-locking engagement.

In applications of the emergency locking retractor within a three-point system wherein the operator and the vehicle are jolted and bounced in dramatic contrast to the ride experienced in the normal passenger car, such as in semitrailer cabs, the snug tension upon the webbed belt experienced at rest can be repeatedly eased as the operator is bounced in the seat. In semitrailer cabs, for example, the operator's seat is typically a suspension seat dampened by air cylinders. It is typical for the operator's suspension seat to move fore and aft by three (3) to four (4) inches and to move up and down to the same degree during normal operations. With each downward or rearward bounce, the snug tension on the webbed belt can be loosened to such a degree that the spring-biased spool of the emergency locking retractor operates to retract webbed belt onto the retractor spool until a snug tension is reestablished. If the upward or forward rebound does not accelerate the webbed belt at the rate necessary to lock the retractor, and if the vehicle's jostling does not otherwise cause the pendulum device within the retractor to move into spool-locking engagement, the operator will experience only the continual discomfort of the webbed belt chafing the operator's shoulder and upper body as the operator's upward and forward rebounds cause the webbed belt to be withdrawn from the spool.

On the other hand, if the upward or forward rebounds of the operator accelerate the webbed belt at a rate that will cause the retractor spool to lock, or if the vehicle's jostling is sufficient to cause the acceleration sensitive pendulum device within the retractor to move into spool-locking engagement, the operator will experience the greater discomfort of the webbed belt suddenly locking upon the operator's rebound, restraining the operator in the downward or aft position. As the rate of acceleration of the webbed belt decreased, the webbed belt acceleration-sensitive locking mechanism of the retractor would unlock, thereby allowing the webbed belt to be withdrawn from the retractor spool. However, the vehicle acceleration-sensitive locking mechanism of the emergency locking retractor typically requires the webbed belt to be retracted slightly onto the retractor spool before it will be released from its spool-locking engagement. Therefore, the operator could be restrained in the downward or aft bounce position by reason of the vehicle acceleration-sensitive locking mechanism of the retractor even thought the webbed belt acceleration and the vehicle inertia had decreased.

Disclosed herein is a novel belt retraction locking device for use in a three-point seat and shoulder belt retraction system utilizing an emergency locking retractor. The disclosed device allows the operator to manually counterbalance the spring bias of the emergency locking retractor spool to thereby deactivate the retractor spool's normal urging of the webbed belt into a retracted condition after the operator has comfortably tensioned the webbed belt. The subsequent movements of the operator that result in easing of the snug tension upon the webbed belt will therefore not result in the webbed belt being withdrawn into the retractor. The disclosed belt retraction locking device is also operable to automatically unlock the webbed belt, thereby releasing the webbed belt from the influence of the disclosed device, when the operator forcibly tensions the webbed belt, such as would occur when the operator of a semi-trailer cab leans far forward and over the steering wheel, as he sometimes must, to facilitate turning the vehicle sharply. Absent such automatic unlocking, the operator would be restrained from forward movement beyond that which had been accommodated by the original tensioning of the webbed belt, for the belt retraction locking device would not only prevent retraction of the webbed belt into the retractor but also additional withdrawal of the webbed belt as well.

SUMMARY OF THE INVENTION

One embodiment of the present invention is a belt retraction cam lock for installation in a motor vehicle having a three-point belt restraining system with an emergency locking belt retractor, comprising a base member attachable to the motor vehicle, a top member pivotally mounted to the base member, and between which the belt is disposed and is slidably passable, belt retraction locking means disposed between the base member and the top member to lockingly but releasably engage the belt, counterbalancing the normal urging of the belt into a retracted condition within the belt retractor, and means for releasing the belt from the locking engagement of the belt retraction locking means when the belt is forcibly tensioned within the base and top members.

Another embodiment of the present invention is a belt retraction cam lock, comprising a three-point belt restraining system, an emergency locking belt retractor within the system, a base member attachable to the motor vehicle, a top member pivotally mounted to the base member, and between which the belt is disposed and is slidably passable, belt retraction locking means disposed between the base member and the top member to lockingly but releasably engage the belt, counterbalancing the normal urging of the belt into a retracted condition within the belt retractor, and means for releasing the belt from the locking engagement of the belt retraction locking means when the belt is forcibly tensioned within the base and top members.

Another embodiment of the present invention is a passenger safety restraint device for installation in a vehicle, comprising a safety belt means having first end means securable to a vehicle and also having second end means, a retractor means mountable to the vehicle having the second end means mounted thereto being operable to normally urge the belt means into a retracted condition within the retractor means but yieldable to allow withdrawal of the belt means therefrom, a buckle and tongue means mountable to the vehicle and movably attached to the belt means at an intermediate location between the first end means and the second end means and operable to removably secure the belt means at the intermediate location to the vehicle, the locking means mountable to the vehicle and having the belt means slidably extend therethrough, the locking means having a locking position whereat the belt means is secured thereto, limiting motion therebetween and overcoming the normal urging of the belt means within the retractor means and having an unlocking position whereat the belt means is retractable into the retractor means, and unlocking means for releasing the belt means from the locking engagement of the locking means when the belt means is forcibly tensioned within the locking means.

It is an object of the present invention to provide a new and improved belt retraction cam lock for use in a typical three-point belt restraining system with an emergency locking belt retractor.

It is a further object of the present invention to provide a belt locking device to counterbalance the spring-biased spool of an emergency locking belt retractor in a typical three-point belt restraining system to thereby deactivate the normal urging of a slackened belt into a retracted condition within the retractor after it has been originally tensioned by the operator, and to provide the belt locking device with an automatic unlocking mechanism to free the belt from the influences of the belt locking device when the operator forcibly tensions the belt thereby allowing the operator freedom of forward movement.

Related objects and advantages of the present invention will be apparent from the following description.

DESCRIPTION OF THE PREFERRED EMBODIMENT

Figure 1:
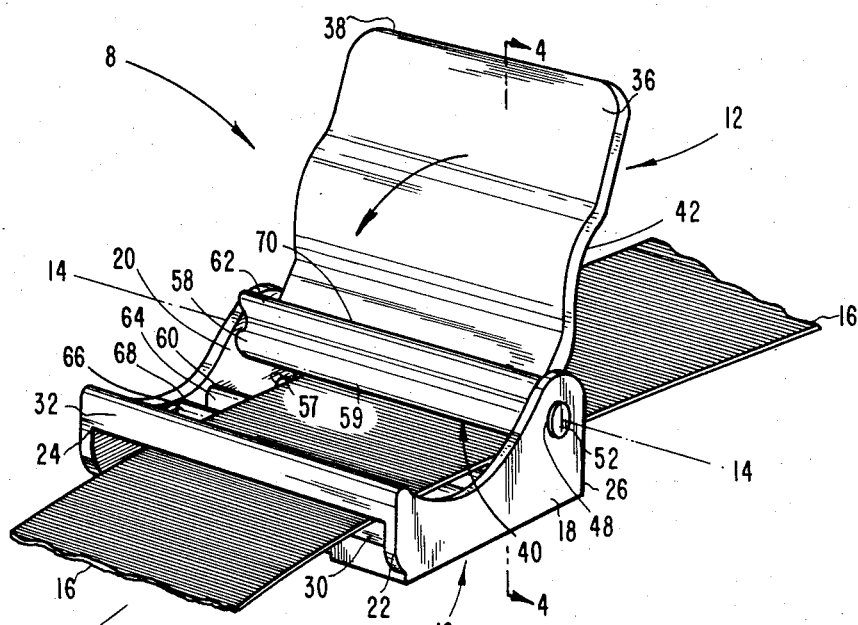
FIG. 1 is a perspective view of the preferred embodiment of the belt retraction cam lock 8 that is the present invention in its belt unlocking position, with belt 16.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
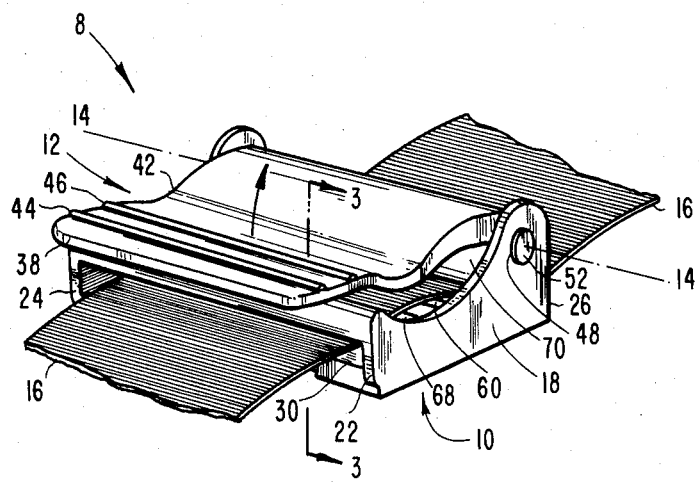
FIG. 2 is a perspective view of the belt retraction cam lock 8 of FIG. 1 in its belt locking position, with belt 16.

Referring now to the drawings, there is shown in FIGS. 1 and 2 the preferred embodiment of the belt retraction cam lock 8 of the present invention shown in FIG. 1 in the belt unlocking position, to be described below, with a webbed belt 16 slidably passable therethrough. This embodiment is composed of a base member 10, and a top member 12 that is pivotally mounted to base member 10 about pivotal axis 14—14 to permit top member 12 to be pivoted about axis 14—14 in the direction of the arrow in FIG. 1, between a belt unlocking position (FIG. 1) and a belt locking position shown in FIG. 2 below, to be described below, and vice versa.

Figure 5:
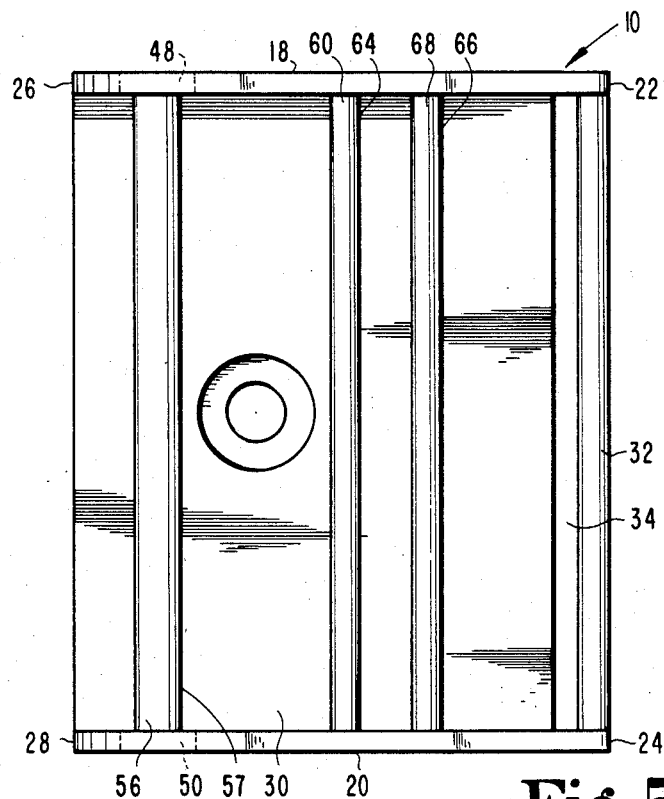
FIG. 5 is an enlarged top view of base member 10 of FIG. 1.
Figure 6:
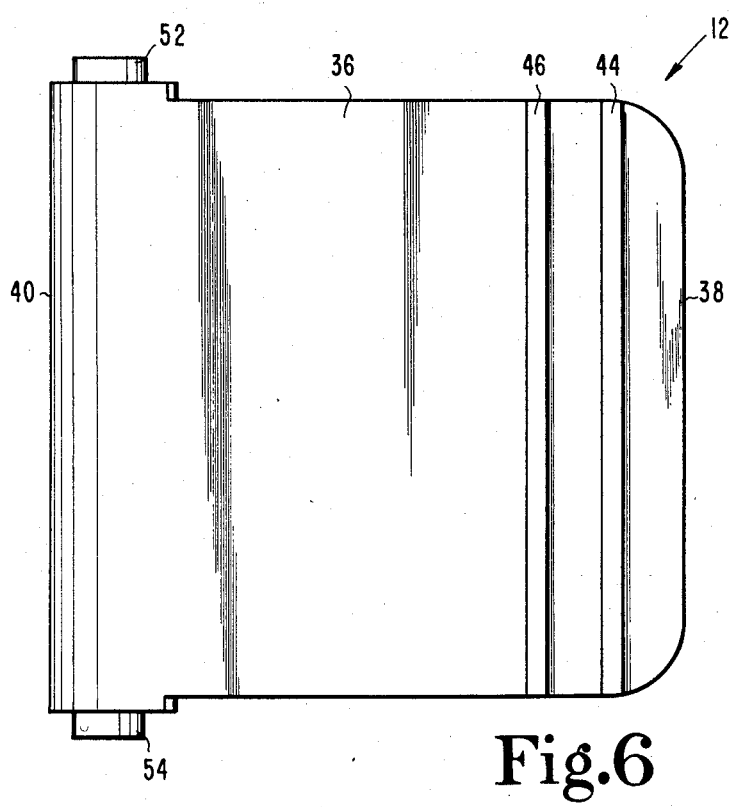
FIG. 6 is an enlarged top view of top member 12 of FIG. 1.

Referring to FIGS. 1, 2, and 5, base member 10 includes a pair of spaced apart symmetrical side walls 18 and 20, having symmetrical first side wall ends 22 and 24, respectively, and symmetrical second side wall ends 26 and 28, respectively. Base member side walls 18 and 20 are joined together by a first support member 30 and a second support member 32. First and second support members 30 and 32 define a slot 34 (FIG. 5) disposed between first side wall ends 22 and 24 through which belt 16 is slidably passable. Referring to FIGS. 1, 2, and 6, top member 12 includes a third support member 36 with a first top member end 38 and a second top member end 40.

Referring to FIGS. 1, 2, 5, and 6, base member 10 is provide with two circular holes 48 and 50, disposed in second side wall ends 26 and 28, respectively, of base member 10, the circumference of each hole 48 and 50 being of equal radial distance from their respective center points, which each lie upon the line that is pivotal axis 14—14. Circular holes 48 and 50 receive correspondingly sized circular tabs 52 and 54 disposed at and appended to the lateral extremes of second top member end 40. The latitudinal dimension of top member 12 at second top member end 40 is such that top member 12 is snugly received between base member side walls 18 and 20 when circular tabs 52 and 54 are received by circular holes 48 and 50, respectively. Although top member 12 is free to pivot about pivotal axis 14—14, top member 12 is held in any position to which it is pivoted, including the belt unlocking position shown in FIG. 1, by frictional forces between top member 12 and base member 10.

Referring to FIGS. 1, 3, 4, and 5, the belt retraction locking means disclosed herein includes a first locking surface 56 on base member 10, and a second locking surface 58 on top member 12. In the preferred embodiment, first locking surface 56 is a portion of the surface of a semicircular ridge 57 running latitudinally across first support member 30 of base member 10 between base side walls 18 and 20, and is disposed directly under and is disposed toward pivotal axis 14—14. Second locking surface 58 in the preferred embodiment is a portion of the surface of a first cam 59 disposed at second top member end 40 and disposed toward base member 10, and which is moveable with top member 12 about a radial axis (line 71—71) that intersects pivotal axis 14—14.

Figure 3:
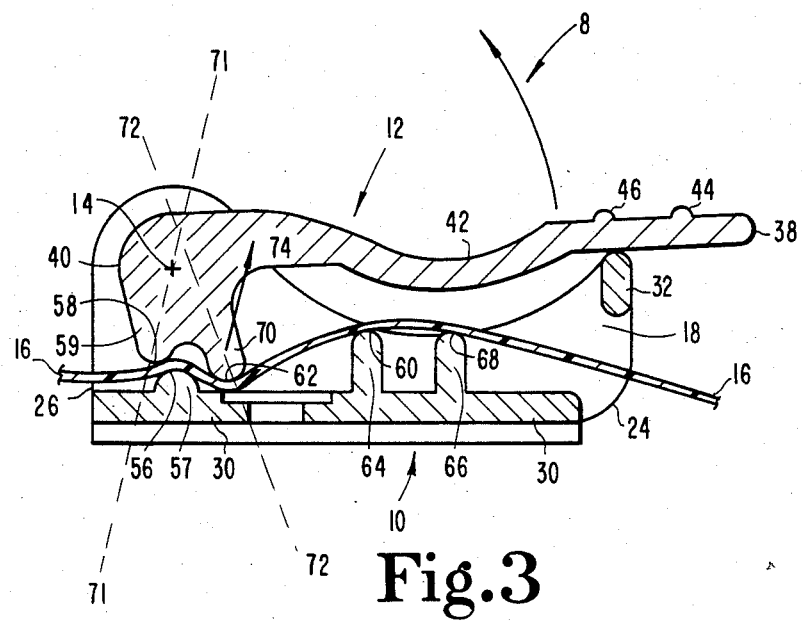
FIG. 3 is an enlarged cross sectional view of base member 10, top member 12, and belt 16 of FIG. 2 taken along line 3—3 and viewed in the direction of the arrows.
Figure 4:
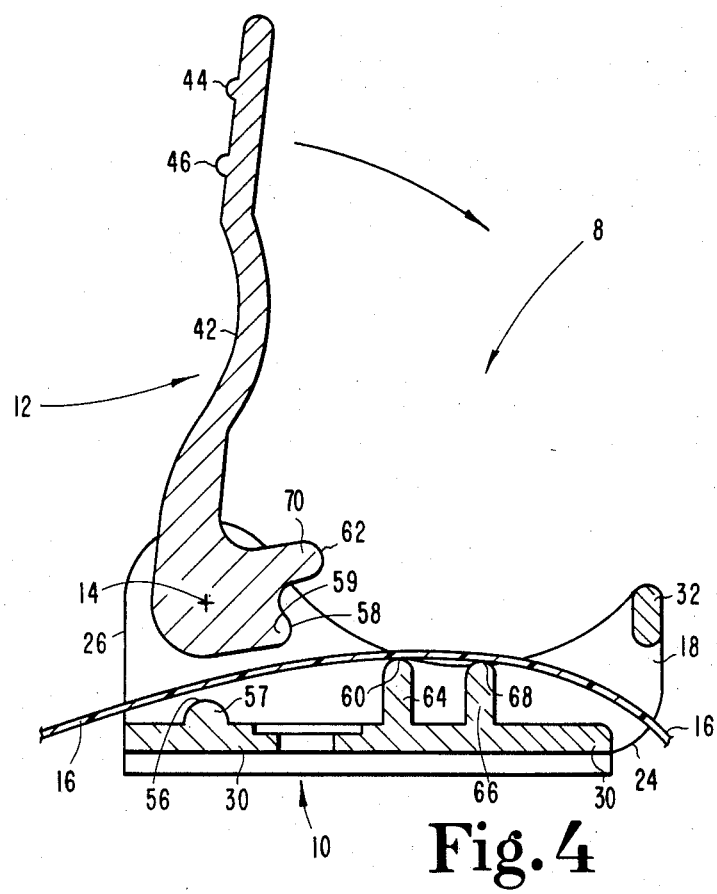
FIG. 4 is an enlarged cross sectional view of base member 10, top member 12, and belt 16 of FIG. 1 taken along line 4—4 and viewed in the direction of the arrows.

Referring to FIGS. 1 and 4, belt 16 is slidably disposed between base member 10 and top member 12 when second locking surface 58 of first cam 59 of top member 12 is disaligned, with first locking surface 56 of semicircular ridge 57 of bottom member 10, as shown in FIG. 4, defining the belt unlocking position of the present invention. Referring now to FIGS. 2 and 3, when top member 12 is pivoted about pivotal axis 14—14, until second locking surface 58 of first cam 59 of top member 12 is aligned with first locking surface 56 of semicircular ridge 57, of bottom member 10 as shown in FIG. 3, first locking surface 56 and second locking surface 58 pinchingly arrest belt 16 therebetween, defining the belt locking position of the present invention. In the preferred embodiment, this belt locking position is further defined when top member 12 comes to rest upon second support member 32 of base member 10, as shown in FIG. 3.

In the absence of belt 16, there is a gap between first locking surface 56 and second locking surface 58 when they are aligned in the belt locking position shown in FIG. 3. The size of this gap is determined by the thickness of belt 16 and is to be selected in reference thereto such that first locking surface 56 and second locking surface 58 can be aligned in the manner described and shown in FIG. 3 with belt 16 arrested therebetween, with sufficient frictional forces upon belt 16 to counterbalance the normal urging the belt 16 into the retracted condition under the influence of the retractor's spring-biased spool.

Referring to FIGS. 1, 3, 4, and 5, the unlocking means disclosed herein includes a first release surface 60 on base member 10 over which belt 16 is slidably passable and which is disposed to elevate belt 16 above the elevation of first locking surface 56 of base member 10. The unlocking means also includes a second release surface 62 on top member 12 over which belt 16 is slidably passable and which is disposed to depress belt 16 lower than the elevation of first locking surface 56 of base member 10 at a point between first locking surface 56 and first release surface 60 on base member 10.

In the preferred embodiment first release surface 60 on base member 10 is a portion of the topmost semicircular surface of at least one rib 64 running latitudinally across first support member 30 of base member 10 between base member side walls 18 and 20. Alternatively, a second rib 66, with a topmost surface 68, running parallel to rib 64 between base member side walls 18 and 20 may be provided.

Second release surface 62 of the preferred embodiment is a portion of the surface of a second offset cam 70 disposed at second top member end 40 adjacent and parallel first cam 59, second release surface 62 also being moveable about pivotal axis 14—14 with top member 12 and first cam 59. Unlike first cam 59, however, second offset cam 70 does not rotate about a radial axis that intersects pivotal axis 14—14. Referring to FIG. 3, second offset cam 70 rotates about line 72—72, which does not intersect pivotal axis 14—14. Line 72—72 tangentially intersects a circle of constant radius which has a center point located upon pivotal axis 14—14. A force applied to second release surface 62 and thus through second offset cam 70 is therefore operable to provide a moment of force about pivotal axis 14—14. When such moment of force is greater than the frictional forces pinchingly arresting belt 16 in the belt locking position, top member 12 will be forcibly rotated from the belt locking position (FIG. 3) toward the belt unlocking position (FIG. 4) of the present invention. A force (force vector 74, FIG. 3) is provided to second release surface 62 by belt 16, and through second offset cam 70, whenever belt 16 is forcibly tensioned between first locking surface 56 of base member 10 and first release surface 60 of base member 10. A force of sufficient magnitude (vector 74) to generate a moment of force about pivotal axis 14—14 that will forcibly rotate top member 12 from the belt locking to the belt unlocking position of the present invention is provided via the tensional forces the operator would apply to belt 16 between first locking surface 56 and first release surface 60 whenever the operator purposefully leans forward against the otherwise comfortably tensioned belt 16.

Figure 8:
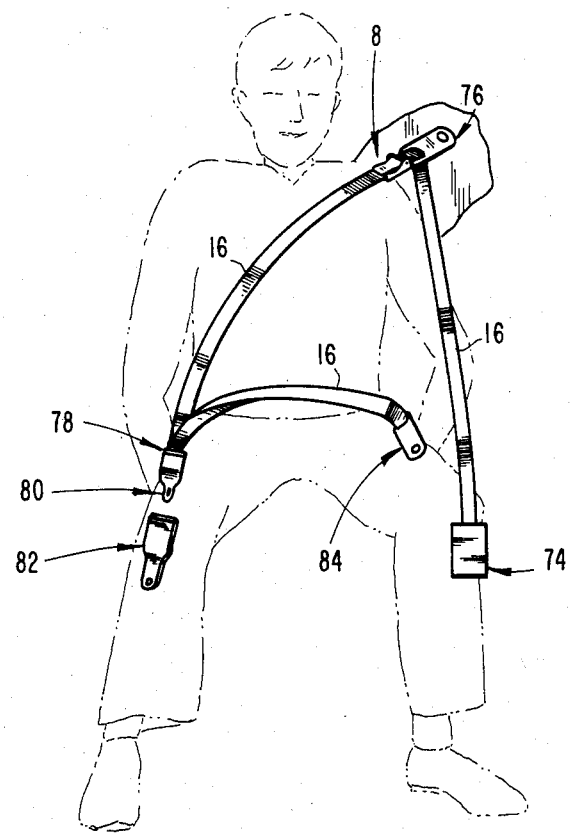
FIG. 8 is a perspective view of a three-point belt restraining system with an emergency locking belt retractor and the belt retraction cam lock of the present invention.

Referring now to FIG. 8, in the preferred embodiment of the present invention, the belt retraction cam lock 8 is attached by conventional means to first D-ring assembly 76 of the typical three-point belt restraining system, base member second side wall ends 26 and 28 (FIG. 5) of belt retractor cam lock 8 abutting assembly 76. First D-ring assembly 76 is in turn fixably attached to the vehicle (FIG. 8). Such conventional means would include utilizing a through bolt and nut to secure base member 10 of belt retraction cam lock 8 to a receiving tongue extension of first D-ring assembly 76 (not shown in FIG. 8). The belt retraction cam lock 8 is thereby fixably positioned between the retractor 74 and the first contact point belt 16 would have with the restrained vehicle operator after exiting retractor 74.

Figure 7:
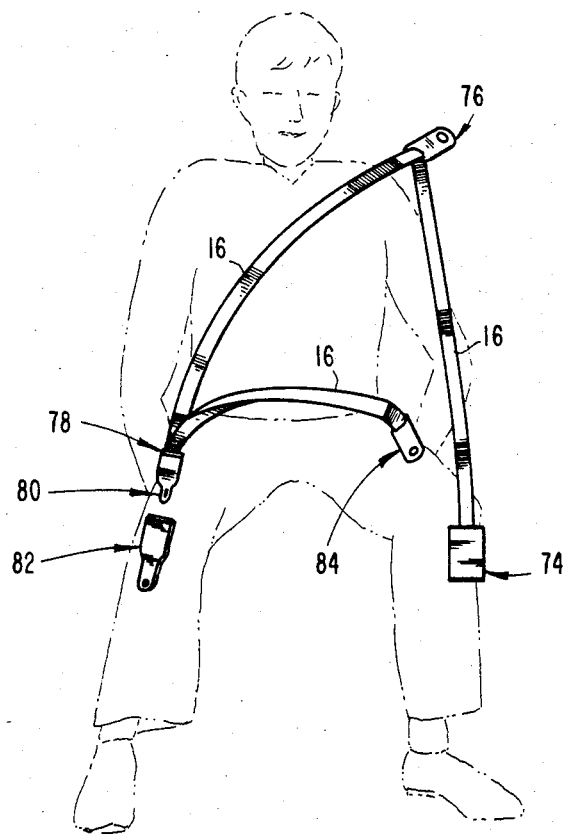
FIG. 7 is a perspective view of a typical three-point belt restraining system with an emergency locking belt retractor, and is a prior art drawing.

In other embodiments of the three-point belt restraining system, two emergency locking retractors are utilized. For example, in such embodiments the deadend third point 84 (FIGS. 7 and 8) is replaced with second emergency locking belt retractor. In such embodiments, the belt retraction cam lock 8 of the present invention is fixably attached between each emergency locking retractor utilized and the first contact points of belt 16 with the operator after belt 16 exits each retractor.

Referring to FIGS. 1, 2 and 6, third support member 36 of top member 12 is provided with a concave contour 42 running laterally across third support surface 36 midway between first and second top member ends 38 and 40, the contour 42 being disposed toward base member 10 when top member 12 is in the belt locking position (FIG. 2), as described above. Third support surface 36 is also provided with ridges 44 and 46 running laterally across third support surface 36 disposed between contour 42 and first top member end 38 in a direction away from base member 10 when top member 12 is in the belt locking position (FIG. 2). Contour 42 and ridges 44 and 46 are provided to accommodate the operator's fingers as the operator manually pivots top member 12 from the belt unlocking position (FIG. 1) to the belt locking position (FIG. 2) as described above.

The belt retraction cam lock 8 of the present invention may be constructed from a variety of suitable materials. In the preferred embodiment, a suitably hardened durable plastic material is preferable for ease of manufacture and for its light weight.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A belt retraction cam lock for installation in a vehicle having a three-point belt restraining system with an emergency locking belt retractor, comprising:
   a base member attachable to the motor vehicle;
   a top member pivotally mounted to said base member, and between which the belt is disposed and is slidably passable;
   belt retraction locking means disposed between said base member and said top member to lockingly but releasably engage the belt, counterbalancing the normal urging of the belt into a retracted condition within the belt retractor; and
   unlocking means for automatically releasing the belt from the locking engagement of said belt retraction locking means when the belt is forcibly tensioned within said base and top members.

2. The belt retraction cam lock of claim 1 wherein:
   said belt retraction locking means includes a first locking surface on said base member and a second locking surface on said top member, said base member and said top member defining a belt locking position when said second locking surface is pivotally aligned with said first locking surface, the belt being arrested therebetween, and defining a belt unlocking position when said second locking surface is pivotally disaligned with said first locking surface, the belt being slidably passable therebetween.

3. The belt retraction cam lock of claim 2 wherein:
   said unlocking means includes a first release surface on said base member, over which the belt is slidably passable, disposed to elevate the belt above the elevation of said first locking surface, and a second release surface on said top member, over which the belt is slidably passable, disposed to depress the belt below the elevation of said first locking surface at a point between said first locking surface and said first release surface.

4. The belt retraction cam lock of claim 3 wherein:
   said base member includes a pair of spaced apart symmetrical base member side walls, having symmetrical first side wall ends and symmetrical second side wall ends, said base member side walls being joined therebetween by a first support member and a second support member, said first and second support members defining a slot through which the belt is disposed and is slidably passable, and said top member includes a third support member with a first top-member end and a second top-member end, said top member being pivotally attached to said base member side walls at said second top-member end about a pivotal axis disposed at said second side wall ends and intersecting said base member sidewalls.

5. The belt retraction cam lock of claim 4 wherein:
   said first release surface includes at least one rib extending latitudinally across said first support member between said base member side walls.

6. The belt retraction cam lock of claim 5 wherein:
   said first release surface includes two adjacent and parallel ribs extending latitudinally across said first support member between said base member side walls.

7. The belt retraction cam lock of claim 4 wherein:
   said first locking surface includes a ridge running latitudinally across said first support member between said base member side walls, said ridge being disposed directly below and parallel to pivotal axis.

8. The belt retraction cam lock of claim 4 wherein:
   said second locking surface includes a first cam at said second top-member end disposed latitudinally across said secured top-member end and toward said base member, and moveable about said pivotal axis and operable to pinchingly arrest the belt against said first locking surface when in said belt locking position.

9. The belt retraction cam lock of claim 8 wherein:
said second release surface includes a second offset cam at said second top-member end adjacent and parallel said first cam and operable to provide a moment of force to said top member about said pivotal axis operable to pivot said top member to said belt unlocking position when the belt is forcibly tensioned between said first release surface and said first locking surface.

10. A belt retraction cam lock, comprising:
a three-point seat and shoulder belt restraining system;
an emergency locking belt retractor mounted within said system operable to normally urging said belt into a retracted condition within said belt retractor;
a base member attachable within said system;
a top member pivotally mounted to said base member, and between which said belt is disposed and is slidably passable;
belt retraction locking means disposed between said base member and said top member to lockingly but releasably engage said belt, counterbalancing the normal urging of said belt into a retracted condition within said belt retractor; and
unlocking means for automatically releasing said belt from the locking engagement of said belt retraction locking means when said belt is forcibly tensioned between said base and top members.

11. A passenger safety restraint device for installation in a vehicle comprising:
safety belt means having first end means securable to a vehicle and also having second end means;
retractor means mountable to said vehicle having said second end means mounted thereto being operable to normally urge said belt means into a retracted condition within said retractor means but yieldable to allow withdrawal of said belt means therefrom;
buckle and tongue means mountable to said vehicle and attached to said belt means at an intermediate location between said first end means and said second end means and operable to removably secure said belt means at said intermediate location to said vehicle;
locking means mountable to said vehicle and having said belt means slidably extend therethrough, said locking means having a locking position whereat said belt means is secured thereto, limiting motion therebetween and overcoming the normal urging of said belt means within said retractor means and having an unlocking position whereat said belt means is retractable into said retractor means; and
unlocking means for automatically releasing said belt means from the locking engagement of said locking means when said belt means is forcibly tensioned within said locking means.

12. The passenger safety restraint device of claim 11 wherein:
said safety belt means includes a three-point belt restraining system.

13. The passenger safety restraint device of claim 11 wherein:
said retractor means includes an emergency locking belt retractor.

14. The passenger safety restraint device of claim 11 wherein:
said locking means includes
a base member mountable to said vehicle;
a top member pivotally mounted to said base member, and between which said belt is disposed;
a first locking surface on said base member and a second locking surface on said top member, said base member and said top member defining a belt locking position when said second locking surface is pivotally aligned with said first locking surface, the belt being arrested therebetween, and defining a belt unlocking position when said second locking surface is pivotally disaligned with said first locking surface, the belt being slidably passable therebetween.

15. The passenger safety restraint device of claim 14 wherein:
said unlocking means includes a first release surface on said base member, over which the belt is slidably passable, disposed to elevate the belt above the elevation of said first locking surface, and a second release surface on said top member, over which the belt is slidably passable, disposed to depress the belt below the elevation of said first locking surface at a point between said first locking surface and said first release surface.

16. The belt retraction cam lock of claim 15 wherein:
said base member includes a pair of spaced apart symmetrical base member side walls, having symmetrical first side wall ends and symmetrical second side wall ends, said base member side walls being joined therebetween by a first support member and a second support member, said first and second support members defining a slot through which the belt is disposed and is slidably passable, and said top member includes a third support surface with a first top-member end and a second top-member end, said top member being pivotally attached to said base member side walls at said second top-member end about a pivotal axis disposed at said second side wall ends and intersecting said base member sidewalls.

17. The belt retraction cam lock of claim 16 wherein:
said first release surface includes at least one rib extending latitudinally across said first support member between said base member side walls.

18. The belt retraction cam lock of claim 17 wherein:
said first release surface includes two adjacent and parallel ribs extending latitudinally across said first support member between said base member side walls.

19. The belt retraction cam lock of claim 16 wherein:
said first locking surface includes a ridge running latitudinally across said first support member between said base member side walls, said ridge being disposed directly below and parallel to said pivotal axis.

20. The belt retraction cam lock of claim 16 wherein:
said second locking surface includes a first cam at said second top-member end disposed latitudinally across said second top-member end and toward said base member, and moveable about said pivotal axis and operable to pinchingly arrest the belt against said first locking surface when in said belt locking position.

21. The belt retraction cam lock of claim 20 wherein:

said second release surface includes a second offset cam at said second top-member end adjacent and parallel said first cam and operable to provide a moment of force to said top member about said pivotal axis operable to pivot said top member to said belt unlocking position when the belt is forcibly tensioned between said first release surface and said first locking surface.

22. A passenger safety restraint device for installation in a vehicle comprising:

safety belt means having first end means securable to a vehicle and also having second end means;

retractor means mountable to said vehicle having said second end means mounted thereto being operable to normally urge said belt means into a retracted condition within said retractor means but yieldable to allow withdrawal of said belt means therefrom;

buckle and tongue means mountable to said vehicle and attached to said belt means at an intermediate location between said first end means and said second end means and operable to removably secure said belt means at said intermediate location to said vehicle;

locking means mountable to said vehicle and having said belt means slidably extend therethrough, said locking means having a locking position whereat said belt means is secured thereto, limiting motion therebetween and overcoming the normal urging of said belt means within said retractor means and having an unlocking position whereat said belt means is retractable into said retractor means, and including a base member having a pair of spaced apart symmetrical base member side walls, having symmetrical first side wall ends and symmetrical second side wall ends, said base member side walls being joined therebetween by a first support member and a second support member, said first and second support members defining a slot through which said belt means is disposed and is slidably passable, a top member pivotally mounted to said base member, and between which said belt means is disposed, including a third support surface with a first top-member end and a second top-member end, said top member being pivotally attached to said base member side walls at said second top-member end about a pivotal axis disposed at said second side wall ends and intersecting said base member sidewalls, a first locking surface on said base member including a ridge running latitudinally across said first support member between said base member side walls, said ridge being disposed directly below and parallel to said pivotal axis, and a second locking surface on said top member, said base member and said top member defining said belt locking position when said second locking surface is pivotally aligned with said first locking surface, the belt means being arrested therebetween, and defining said belt unlocking position when said second locking surface is pivotally disaligned with said first locking surface, the belt means being slidably passable therebetween; and unlocking means for releasing said belt means from the locking engagement of said locking means when said belt means is forcibly tensioned within said locking means; including a first release surface on said base member having at least one rib extending latitudinally across said first support member between said base member side walls; and over which said belt means is slidably passable, disposed to elevate said belt means above the elevation of said first locking surface, and a second release surface on said top member, over which said belt means is slidably passable, disposed to depress said belt means below the elevation of said first locking surface at a point between said first locking surface and said first release surface.

23. The belt retration cam lock of claim 22 wherein: said second locking surface includes a first cam at said second top-member end disposed latitudinally across said second top-member end and toward said base member, and moveable about said pivotal axis and operable to pinchingly arrest said belt means against said first locking surface when in said belt locking position.

24. The belt retraction cam lock of claim 23 wherein: said second release surface includes a second offset cam at said second top-member end adjacent and parallel said first cam and operable to provide a moment of force to said top member about said pivotal axis operable to pivot said top member to said belt unlocking position when said belt means is forcibly tensioned between said first release surface and said first locking surface.

* * * * *